US007061215B2

(12) United States Patent
Harris

(10) Patent No.: US 7,061,215 B2
(45) Date of Patent: Jun. 13, 2006

(54) CASCADABLE CURRENT-MODE REGULATOR

(75) Inventor: Matthew B. Harris, Durham, NC (US)

(73) Assignee: Intersil Americas Inc., Milpitas, CA (US)

( * ) Notice: Subject to any disclaimer, the term of this patent is extended or adjusted under 35 U.S.C. 154(b) by 92 days.

(21) Appl. No.: 10/739,757

(22) Filed: Dec. 18, 2003

(65) Prior Publication Data

US 2005/0073288 A1   Apr. 7, 2005

Related U.S. Application Data

(60) Provisional application No. 60/508,106, filed on Oct. 2, 2003.

(51) Int. Cl.
*G05F 1/40* (2006.01)
(52) U.S. Cl. ...................................... 323/268; 323/271
(58) Field of Classification Search ................... 363/65, 363/71, 72, 56, 81–89; 323/272, 282, 283, 323/284, 271, 268

See application file for complete search history.

(56) References Cited

U.S. PATENT DOCUMENTS

| 5,028,824 | A | * | 7/1991 | Young | 327/262 |
| 5,973,485 | A | * | 10/1999 | Kates et al. | 323/272 |
| 5,982,160 | A | * | 11/1999 | Walters et al. | 323/282 |
| 6,292,378 | B1 | * | 9/2001 | Brooks et al. | 363/65 |
| 6,396,250 | B1 | * | 5/2002 | Bridge | 323/283 |

* cited by examiner

*Primary Examiner*—Rajnikant B. Patel
(74) *Attorney, Agent, or Firm*—Allen, Dyer, Doppelt, Milbrath & Gilchrist, P.A.

(57) ABSTRACT

A cascadable power regulator including a programmable delay unit and PWM control logic. The programmable delay unit initiates a delay period in response to a digital input signal and asserts a digital output signal upon expiration of the delay period. The PWM control logic controls a PWM cycle in response to the digital input signal and in response to an output control condition. The cascadable regulator uses digital signals to communicate between channels. Digital signals are not prone to the same kind of signal degradation or noise susceptibility as analog signals. Thus, the number of phases is not limited, the physical separation between the regulators is not limited, and the switching frequency is not as limited. There is no clock signal from a separate controller so that the controller is a relatively simple, low-cost device. Since there is no clock, a unique self-oscillating system is achieved using the cascadable regulator.

21 Claims, 3 Drawing Sheets

CASCADABLE CURRENT-MODE REGULATOR

CROSS-REFERENCE TO RELATED APPLICATIONS

This application claims the benefit of U.S. Provisional Application No. 60/508,106 filed on Oct. 2, 2003, which is herein incorporated by reference for all intents and purposes.

BACKGROUND OF THE INVENTION

1. Field of the Invention

The present invention relates to PWM power regulators and/or multi-phase DC-DC converters, and more particularly to a clockless, cascading, current-mode regulator with high noise immunity and arbitrary phase count.

2. Description of the Related Art

Multi-phase power conversion and current-mode control are commonly used methods for DC-DC power conversion for the electronic market. Multi-phase power conversion provides a cost-effective power solution when load currents are no longer easily supported by single-phase converters. The switching of each channel is timed to be symmetrically out of phase with each of the other channels. The multi-phase approach offers cost-saving advantages with improved response time, superior ripple cancellation, and improved thermal distribution.

The electronic market has evolved, however, to the point that the number of phases required in a multi-phase power regulator exceeds the number that a single integrated circuit (IC) can practically support. As the phase count grows above four, the IC package becomes large, and the spacing between the power-delivery point and the controller IC exceeds the distance that can accurately support low-level signal integrity and noise rejection. Signal problems necessitate added expense in terms of extra components to suppress noise, layout constraints, and reduced phase count.

Prior methods attempt to solve the excessive package size problem (which is only part of the overall problem) by cascading multiple current-mode regulators. In one case, a separate controller IC generates a triangle-shaped signal common to all of the current-mode regulators. Each of the current-mode regulators initiates its cycle at a different, programmable point on the triangle-shaped signal in an attempt to achieve the necessary phase separation between the different channels. Correct phase separation between the different channels is an important component to multi-phase power conversion necessary for ripple cancellation.

Other problems remain unsolved by prior solutions. The triangle-shaped signal is an analog signal, and is therefore subject to signal degradation and noise interference. Thus the prior method is constrained in terms of the physical separation of the different channels. The noise generated by one channel switching corrupts the triangle-shaped signal reaching the other channels, which limits the time separation between two channels to some value necessary to allow the noise to dissipate. Since the time separation between the channels is limited, so is the phase count and/or switching frequency.

SUMMARY OF THE INVENTION

A cascadable power regulator according to an embodiment of the present invention includes a programmable delay unit and PWM control logic. The programmable delay unit initiates a delay period in response to a digital input signal and asserts a digital output signal upon expiration of the delay period. The PWM control logic controls each PWM cycle in response to the digital input signal and an output control condition. The cascadable regulator thus uses digital signals to communicate between channels. Digital signals are not prone to the same kind of signal degradation or noise susceptibility, so that the number of phases is not limited and the physical separation between the regulators is not limited. There is no clock signal from a separate controller so that the controller is a relatively simple, low-cost device. Since there is no clock, a unique self-oscillating system is achieved using the cascadable regulator.

In one configuration, the PWM control logic includes PWM logic and feedback sense logic. The PWM logic initiates a PWM cycle in response to the digital input signal and terminates the PWM cycle in response to a reset signal. The feedback sense logic asserts the reset signal when the output control condition is met. In a particular embodiment, the feedback sense logic includes a sense amplifier and a comparator. In this case, the sense amplifier senses an output current condition and provides a corresponding sense signal. The comparator compares the sense signal with a feedback reference signal to determine the output control condition. The output current condition may be sensed in any suitable manner, such as peak, average or valley current of an output inductor or other sensing component.

A multiphase power converter according to an embodiment of the present invention includes multiple regulators coupled in a cascade configuration, multiple switching circuits and a controller. Each regulator includes a programmable delay unit and a PWM control circuit. The programmable delay unit receives a digital start input signal from a previous regulator and provides a digital start output signal to a next regulator after a predetermined delay. The PWM control circuit controls a PWM output based on assertion of the digital start input signal and based on meeting an output condition. Each switching circuit has an input coupled to a PWM output of a corresponding regulator, an output for driving a common DC output voltage, and a sense output provided to the PWM control circuit. The controller senses the DC output voltage and provides a compensation signal to the PWM control circuit of a corresponding regulator.

The multiphase power converter does not require a central clock signal and digital signals are employed to establish timing between the regulators. For N regulators, a selected switching frequency FSW is achieved by programming the predetermined delay of each regulator with a delay of $1/(N*FSW)$.

A method of controlling each of multiple cascadable regulators of a multiphase converter includes coupling a digital output of each regulator to a digital input of another regulator, providing a digital output signal on the digital output after a predetermined delay in response to receiving a digital input signal at the digital input, and controlling a PWM cycle in response to receiving the digital input signal and in response to detecting an output condition. The method may further include programming a switching frequency FSW of the multiphase converter by programming the predetermined delay of each of N regulators coupled in cascade to $1/(N*FSW)$. The method may include detecting an output current condition and generating a sense signal, and comparing the sense signal with a compensation signal. The method may include detecting peak current, such as through an output inductor or the like. The method may further include providing a central controller that senses an output voltage condition and that provides the compensation signal to each regulator.

BRIEF DESCRIPTION OF THE DRAWING(S)

The benefits, features, and advantages of the present invention will become better understood with regard to the following description, and accompanying drawing in which.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

A cascadable current-mode regulator according to an embodiment of the present invention uses a digital signal to communicate between channels. The current-mode regulator may be used alone or cascaded with other similar regulators for a DC-DC converter with multiple channels. As used herein, the term "converter" is used to denote a cascaded configuration of multiple "regulators", where it is understood that such terms are general in nature and are typically interchangeable. Digital signals are not prone to the same kind of signal degradation or noise susceptibility, so there is no practical limit to the number of phases nor the physical separation between the regulators. A separate controller is provided in a control feedback loop to monitor the load and control the regulators. There is no clock signal from the separate controller IC, however, making the controller IC a very simple low-cost device. Since there is no clock, a unique self-oscillating system is achieved using the cascadable current-mode regulator.

Figure 1:
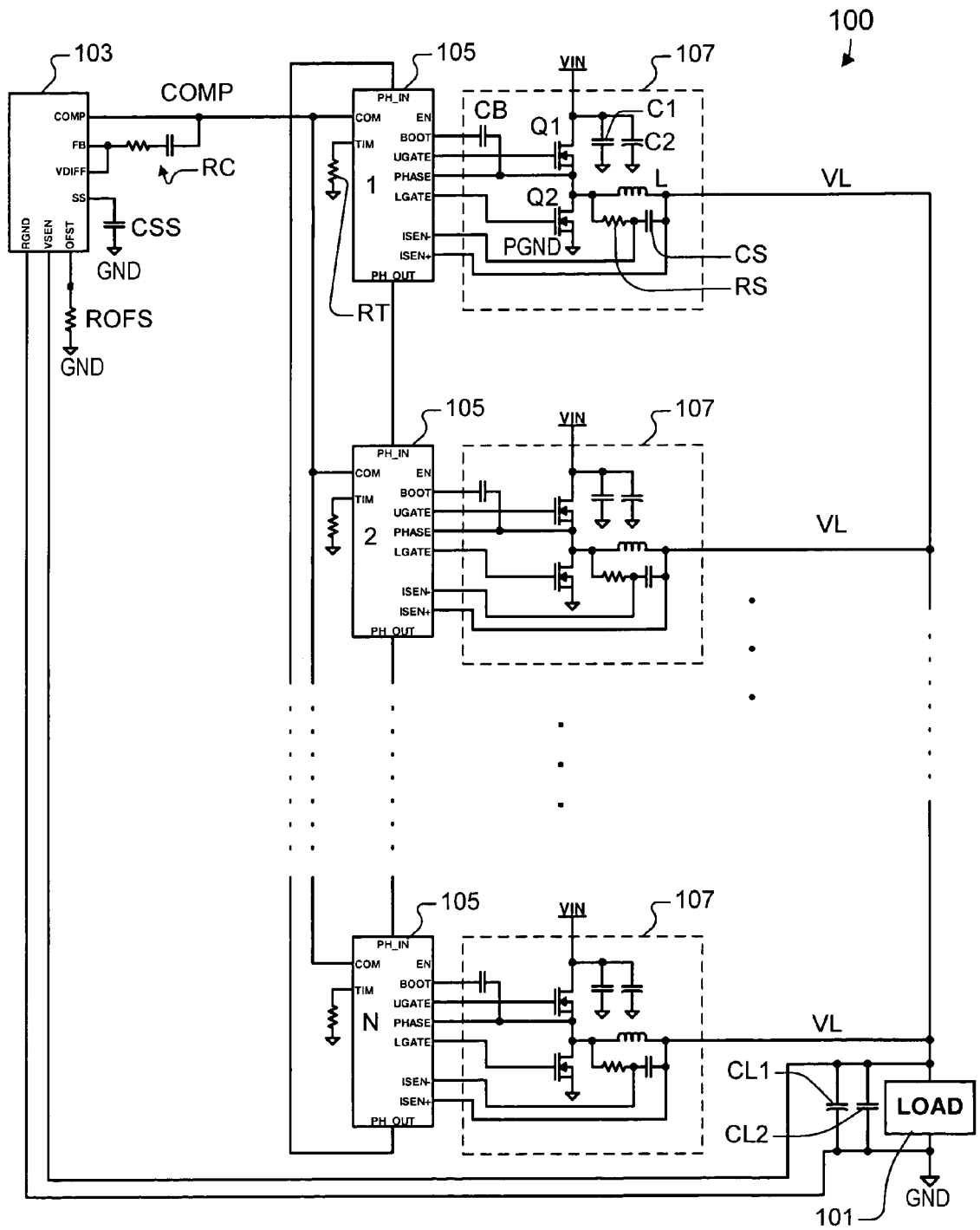
FIG. 1 is a schematic diagram of a multi-phase DC-DC converter according to an exemplary embodiment of the present invention.

FIG. 1 is a schematic diagram of a multi-phase DC-DC converter 100 according to an exemplary embodiment of the present invention. The converter 100 develops a load voltage VL provided to a load 101 referenced to ground (GND). A couple of load capacitors CL1 and CL2 are coupled between VL and GND near the load 101. The VL signal is fed back to a voltage sense (VSEN) pin of a controller 103, which also has a ground (RGND) pin coupled to GND. The term "pin" is used to reference a connection to a device, where the connection may be an input, an output or both (generally, an input/output or I/O connection). The device may be implemented as a chip or IC with I/O pins, although discrete implementations are also contemplated. The controller 103 has a COMP pin providing a COMP signal to a COM pin of one or more current-mode regulators 105 coupled in a cascade configuration. In the configuration shown, there are N regulators 105 (individually numbered from 1 to N where N is any positive integer). A series-coupled resistor-capacitor (RC) circuit has one end coupled to the COMP pin and another end coupled to a feedback (FB) pin and to a VDIFF pin of the controller 103. The controller 103 also includes a soft-start (SS) pin coupled to one end of a soft-start capacitor CSS, which has its other end coupled to GND. The controller 103 further includes an offset (OFST) pin coupled to one end of an offset resistor ROFS, which has its other end coupled to GND.

Each regulator 105 has a phase input (PH_IN) pin and a phase output (PH_OUT) pin. In accordance with the cascade configuration, the PH_IN pin of each regulator 105 is coupled to the PH_OUT pin of a preceding regulator, and the sequence continues until the PH_OUT pin of the last regulator, numbered N, is coupled to the PH_IN pin of the first regulator, numbered 1. Each regulator 105 asserts a digital signal on its PH_OUT pin, which provides superior signal integrity as compared to prior methods which employ analog signals. Each regulator 105 forms an individual channel of the converter 100 and incorporates a driver circuit that drives a corresponding one of N PWM switch circuits 107 that collectively develop of the VL signal. Only one switch circuit 107 is described, where it is understood that each of the N switch circuits 107 are substantially the same.

Each regulator 105 includes multiple pins coupled to a corresponding switch circuit 107, including a bootstrap (BOOT) pin, an upper gate (UGATE) pin, a phase (PHASE) pin, a lower gate (LGATE) pin, and a pair of differential current sense input pins including a negative polarity current sense (ISEN−) pin and a positive polarity current sense (ISEN+) pin. Within the switch circuit 107, a bootstrap capacitor CB is coupled between the BOOT and PHASE pins. The UGATE pin is provided to the gate of a first switch Q1 and the LGATE output pin is provided to the gate of a second switch Q2. In the embodiment shown, the switches Q1 and Q2 are implemented as N-channel metal-oxide semiconductor, field-effect transistors (MOSFETs), although other types of switches are contemplated including semiconductor switches suitable for IC fabrication. A power source input voltage VIN is provided to the drain of Q1, having its source coupled to the PHASE pin of the regulator 105 and to the drain of Q2. The source of Q2 is coupled to power ground (PGND), where the power ground PGND is shown as separate from signal ground GND as known to those skilled in the art. The VIN signal is typically twelve volts (12 V), although other voltage levels are contemplated.

The PHASE pin is coupled to one end of an output inductor L and to one end of a sense resistor RS. The other end of the sense resistor RS is coupled to the ISEN− pin and to one end of a sense capacitor CS. The other end of the sense capacitor CS is coupled to the ISEN+ pin of the regulator 105, and to the other end of the output inductor L, which develops the VL signal. In this manner, the output side of each output inductor L of each of the switch circuits 107 are coupled together at VL and to the ISEN+ pin of each regulator 105. Each regulator 105 includes a timing (TIM) pin coupled to one end of a timing resistor RT, which has its other end coupled to GND. The output inductor L is configured in any suitable fashion as known to those skilled in the art, such as an individual inductor, a primary inductor of a transformer, an inductor with a core, etc.

Figure 2:
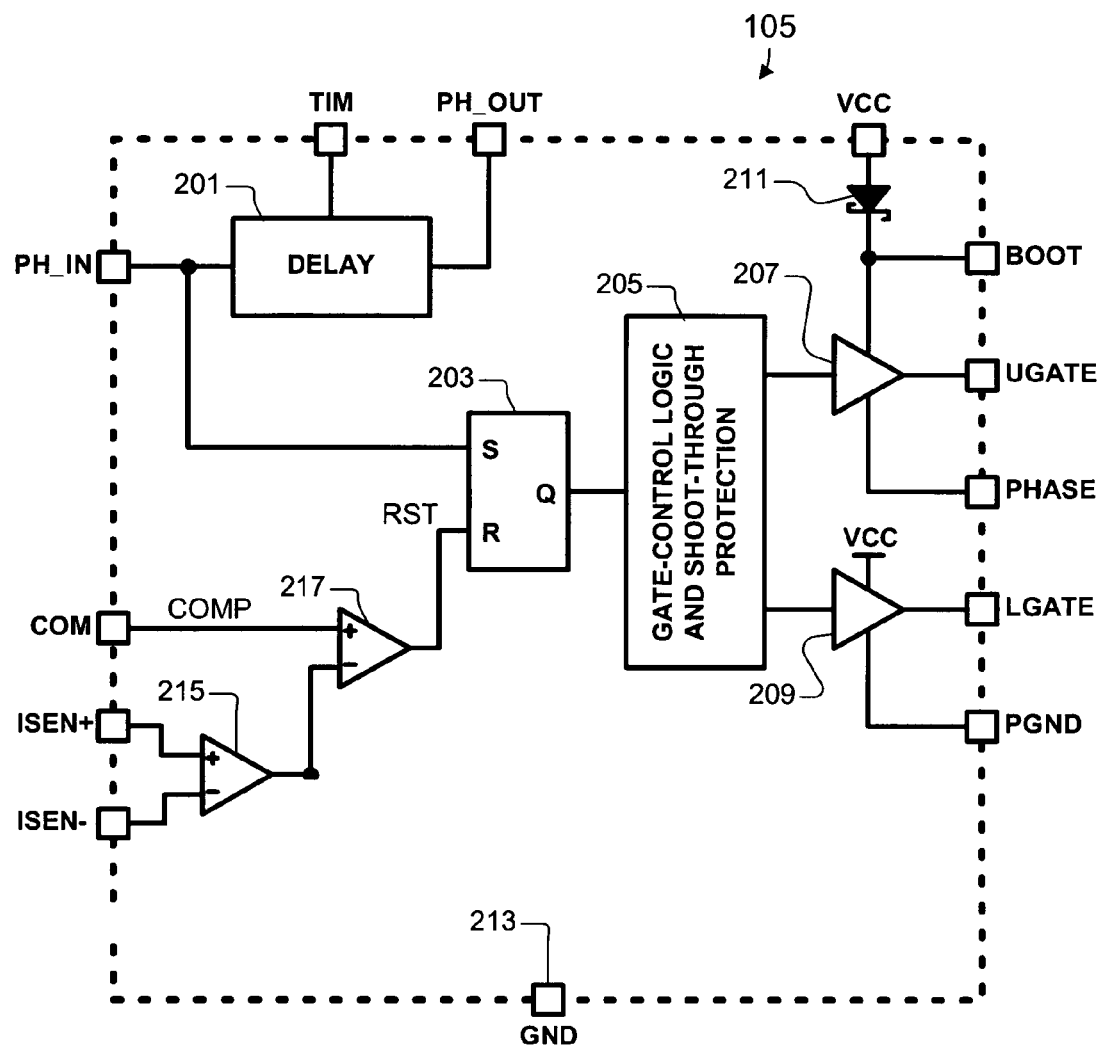
FIG. 2 is a schematic diagram of an exemplary embodiment of each of the current-mode regulators of FIG. 1.

FIG. 2 is a schematic diagram of an exemplary embodiment of each of the current-mode regulators 105. The PH_IN input pin is provided to an input of a delay block 201, which is coupled to the TIM pin and has an output coupled to the PH_OUT output pin of the regulator 105. The PH_IN input pin is also coupled to the set input (S) of a latch 203, which is implemented as a set-reset flip-flop (SRFF) in the embodiment shown, although any suitable latch, flip-flop or storage device is contemplated. The latch 203 has a Q output coupled to an input of gate control logic 205. The gate control logic 205 has a first output coupled to the input of a first driver amplifier 207 and a second output coupled to the input of a second driver amplifier 209. The gate control logic 205 provides pulse-width modulation (PWM) control of the switches Q1 and Q2 and also provides shoot-through protection as understood by those skilled in the art. The regulator 105 has a VCC pin for coupling to and receiving a VCC supply voltage, which is provided to the anode of a Schottky diode 211 and to the positive power input of the amplifier 209. The VCC supply voltage, referenced to GND, is assumed to be the supply voltage for all logic circuits on the regulator 105. The cathode of the diode 211 is provided to the positive power input of the amplifier 207 and to the BOOT pin. The negative power input of the amplifier 207 is coupled to the PHASE pin and the negative power input of the amplifier 209 is coupled to a separate power ground pin PGND, which is coupled to PGND. The output of the amplifier 207 is coupled to the UGATE pin and the output of the amplifier 209 is coupled to the LGATE pin of the regulator 105.

The regulator 105 has a separate signal ground pin (GND) shown at 213 for coupling to GND. The ISEN+ pin is coupled to a non-inverting input of a current sense amplifier 215, having its inverting input coupled to the ISEN– pin. The output of the amplifier 215 is coupled to the inverting input of a comparator amplifier 217. The non-inverting input of the comparator amplifier 217 receives the COMP signal via the COM pin and the output of the comparator amplifier 217 generates a reset (RST) signal, which is provided to the reset (R) input of the latch 203. The latch 203, the gate control logic 205 and the amplifiers 207 and 209 and supporting circuitry collectively implement PWM logic or a PWM switching circuit suitable for controlling a corresponding one of the switch circuits 107 for PWM operation as known to those skilled in the art. The amplifiers 215 and 217 implement feedback sense logic or feedback comparator logic that asserts the RST signal when a control condition is met, such as an output current or voltage condition at the output of the converter 100. The PWM logic and the feedback sense or comparator logic collectively forms a PWM control circuit or PWM control logic.

In operation, a rising edge applied to the PH_IN pin sets the Q output of the latch 203 high, which causes the gate control logic 205 to initiate a PWM cycle. In the particular embodiment illustrated, the gate control logic 205 turns off the amplifier 209 to turn off Q2, and then turns on the amplifier 207 to turn on Q1. Current is provided to the load 101 from VIN via the output inductor L. The controller 103 senses the voltage of the VL signal to develop the appropriate level of the COMP signal provided to the comparator amplifier 217. In an alternative embodiment, the COMP signal may be a static steady state reference signal. In the configuration illustrated, the current through inductor L is sensed by amplifier 215, so that when the peak current causes the output of the amplifier 215 to become equal with the COMP signal, the comparator 217 asserts the RST signal to reset the latch 203, which negates its Q output to terminate the PWM cycle. In particular, when the Q signal is pulled low in response to resetting the latch 203, the gate control logic 205 turns off the amplifier 207 to turn off the switch Q1, and turns on the amplifier 209 to turn on the switch Q2. The resistor ROFS allows a designer to program a DC offset of a reference signal REF within the controller 103, where the REF signal is further described below.

Meanwhile, the rising edge applied to the PH_IN pin initiates the delay period of the delay block 201, where the delay period is programmable via the timing resistor RT coupled to the TIM pin. When the delay period is completed, the delay logic 201 drives a rising edge on the PH_OUT pin, which initiates the same sequence of events to initiate a power cycle in the next regulator 105 of the converter 100 in the cascaded configuration. A full cycle occurs when each regulator 105 has completed one full delay time. For example, the next cycle of regulator number 1 does not start until triggered by the PH_OUT pin from the regulator numbered N. If each of the N regulators 105 is programmed with a delay time of TD, the switching period of the converter 100 is N*TD, where the asterisk "*" denotes multiplication. The switching frequency of the converter 100 is 1/(N*TD). In order to obtain a desired switching frequency FSW, each of the N regulators 105 is programmed with a delay time of TD=1/(N*FSW).

In the embodiment shown, the converter 100 includes N channels, each implemented with a regulator 105 and corresponding switch circuit 107. The delay block 201 of each regulator may be programmed with the same delay to establish the target FSW. Each channel effectively operates in an independent manner, such that an next channel may be activated while the previous channel is still operating to drive the load 101. The delay is preferably the same for each channel to synchronize operation and to evenly distribute load. In this manner, because of the cascade configuration, each channel is activated in a synchronous manner, although each channel deactivates based on its own sense condition.

Many variations of the particular embodiment illustrated are possible as would be understood by those skilled in the art. The delay block 201, for example, may be configured in any manner known to those skilled in the art to provide a suitable timing function, either programmable or fixed. For example, the delay block 201 may alternatively be configured to use a capacitor or other component coupled via the TIM pin rather than the resistor RT. Also, the delay block 201 may be configured with a fixed delay or otherwise configured with an internally programmable mechanism to program the desired delay period. The particular embodiment illustrated detects peak current through the output inductor L as the output control condition to control each PWM cycle. In the peak current method, each PWM cycle is initiated by digital logic and terminated based on the control condition. Many alternatives are possible and contemplated, such as other current methods or methods based on sensing voltage conditions, and the sensing device may be other than current or voltage of the output inductor L. Other current methods include an average current mode or a valley current mode. In a valley current mode, for example, each PWM cycle is initiated by an output control signal associated with low or valley current and terminated by a logic signal or condition. The present invention is not limited by any particular PWM control method.

Figure 3:
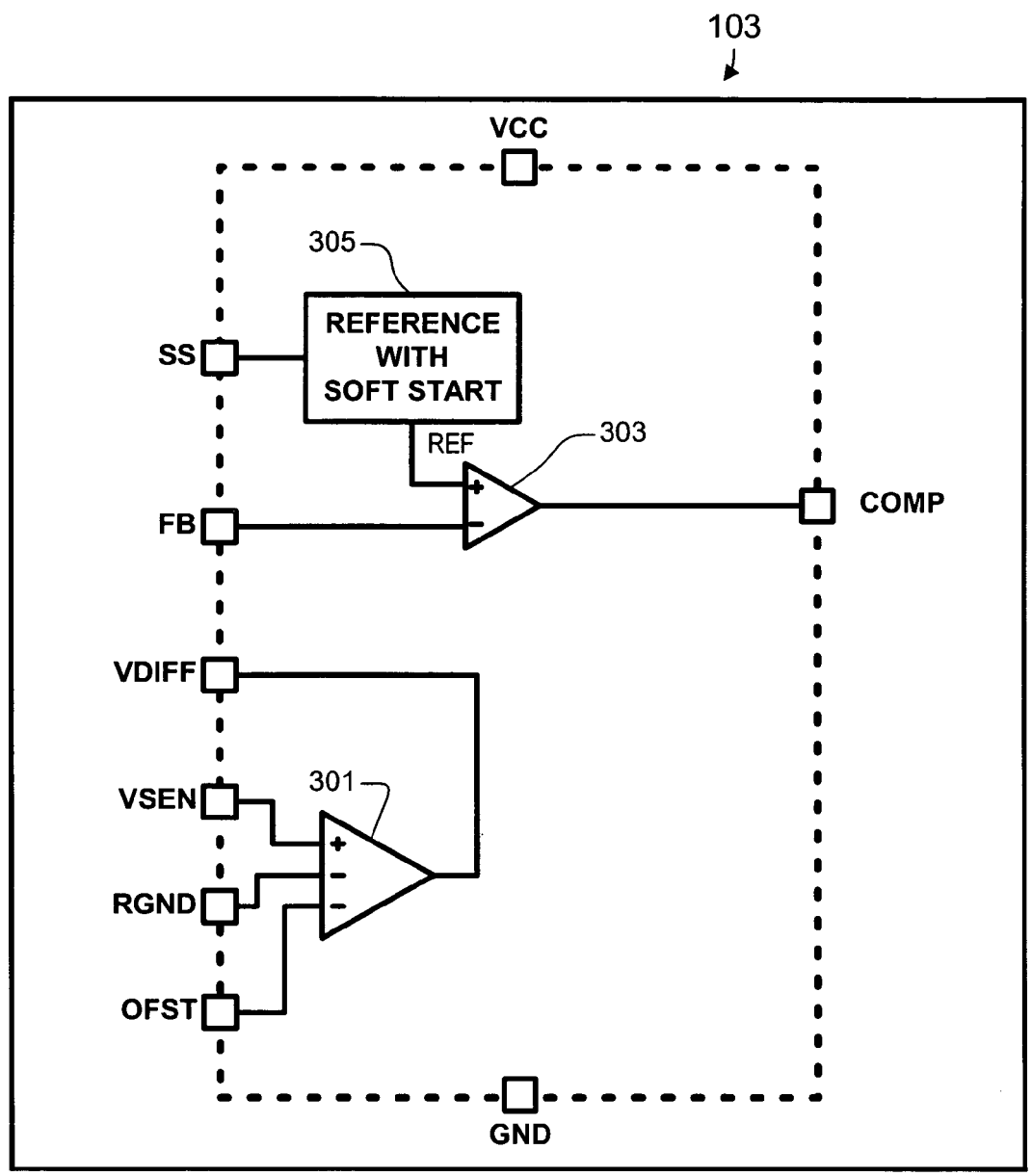
FIG. 3 is a schematic diagram of an exemplary embodiment of the controller of FIG. 1.

FIG. 3 is a schematic diagram of an exemplary embodiment of the controller 103 according to the present invention. In one embodiment, the controller 103 is implemented as a separate chip or IC with VCC and GND pins for coupling to the VCC source voltage and GND, respectively. The VSEN pin is coupled to the non-inverting input of an amplifier 301, which has an inverting input coupled to the RGND pin. The amplifier 301 senses the load voltage VL and generates an output signal provided to the VDIFF pin. The amplifier 301 also includes another offset input (inverting input) coupled to the OFST pin for enabling control of a DC offset of the REF signal via the resistor ROFS. The amplifier 301 is a differential remote-sense amplifier and may be configured as a unity gain amplifier as known to those skilled in the art. In the embodiment shown, the VDIFF pin is coupled to the FB pin, which is coupled to an inverting input of an error amplifier 303. The soft start SS pin is coupled to an input of reference with soft start logic 305, which has an output providing the REF signal to the non-inverting input of the amplifier 303. The output of the error amplifier 303 is coupled to the COMP pin for providing the COMP signal. The capacitor CSS controls a soft start time to initiate PWM operation of the controller 103.

A cascadable regulator according to embodiments of the present invention provides a low cost method of cascading an arbitrary number of phases in a multi-phase DC-DC regulator or converter system. The cascadable regulators enable a self-oscillating system without the need of a clock signal (e.g., a clockless system). Thus, the central controller does not have to provide a clock signal, so that it can be configured as a very simple and low-cost device. The particular controller 103 illustrated is very simple and can be configured in an even simpler manner with a single error amplifier. Each regulator includes a digitally controlled programmable delay unit that receives a digital input and that generates a digital output to the next regulator in the chain of cascaded regulators. The simple digital interfaces (e.g., PH_IN and PH_OUT) provide a significant level of noise immunity as compared to prior methods that employ a common analog signal. Digital signals are not prone to the same kind of signal degradation or noise susceptibility, so that there is no practical limit to the number of phases nor the physical separation between the regulators. The phase count is arbitrary since any number of regulators may be coupled in cascade, as compared to prior techniques having a relatively low phase count and/or switching frequency.

Any target switching frequency FSW for the multiphase or multi-channel converter is achieved by dividing the period by the number of channels and programming each regulator with the corresponding delay. Other benefits are possible, such as unique power savings mode in which any one or more of the regulators may be temporarily suspended or shut down during a low power period. In one power-savings alternative configuration, the delay period of each of the remaining devices is re-programmed to maintain FSW. This first method requires additional control circuitry to enable delay period reprogramming. In another power-savings alternative configuration, the switching frequency of the multiphase converter is allowed to increase during the low power period while one or more of the cascaded regulators are off-line. This second method results in reduced efficiency, yet only during low-power periods so that overall efficiency impact is minimized. In yet another power-savings alternative configuration, the delay of the suspended devices remain enabled while output switching circuitry is disabled. This third method results in increased ripple voltage since less devices are contributing to the output voltage, but such is considered acceptable since only applied during low-power periods during which ripple is less of a concern. Also, in this third alternative mode, the particular devices that are suspended may be selected to optimize results, such as by suspending every other device resulting in symmetrical output ripple.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing out the same purposes of the present invention without departing from the spirit and scope of the invention.

The invention claimed is:

1. A cascadable power regulator, comprising:
   a programmable delay unit that initiates a delay period in response to a digital input signal and that asserts a digital output signal upon expiration of the delay period; and
   PWM control logic that controls each PWM cycle in response to said digital input signal and an output control condition, wherein said PWM control logic comprises:
      PWM logic that initiates a PWM cycle in response to said digital input signal and that terminates said PWM cycle in response to a reset signal; and
      feedback sense logic, coupled to said PWM logic, that asserts said reset signal when said output control condition is met.

2. The cascadable power regulator of claim 1, wherein said PWM logic comprises:
   a latch that sets in response to said digital input signal and that resets in response to said reset signal;
   gate control logic, coupled to said latch, that provides at least one PWM control signal; and
   at least one driver amplifier, each responsive to said at least one PWM control signal.

3. The cascadable power regulator of claim 2, wherein said gate control logic includes shoot-through protection.

4. The cascadable power regulator of claim 1, wherein said feedback sense logic comprises:
   a sense amplifier that senses an output current condition and that asserts a sense signal; and
   a comparator that compares said sense signal with a feedback reference signal to determine said output control condition.

5. A multiphase power converter, comprising:
   a plurality of regulators coupled in a cascade configuration, each comprising:
      a programmable delay unit receiving a digital start input signal from a previous regulator and that provides a digital start output signal to a next regulator after a predetermined delay; and
      a PWM control circuit that controls a PWM output based on assertion of said digital start input signal and based on meeting an output condition;
   a plurality of switching circuits, each having an input coupled to a PWM output of a corresponding one of said plurality of regulators, an output for driving a common DC output voltage, and a sense output provided to a PWM control circuit of said corresponding regulator; and
   a controller that senses said DC output voltage and that provides a compensation signal to said PWM control circuit of said corresponding regulator.

6. The multiphase power converter of claim 5, wherein said PWM control circuit comprises:
   PWM logic that controls said PWM output based on assertion of said digital start input signal and a reset signal; and
   feedback comparator logic, coupled to said PWM logic, that asserts said reset signal based on said compensation signal and said sense output of a corresponding one of said plurality of switching circuits.

7. The multiphase power converter of claim 6, wherein said feedback comparator logic comprises:
   a sense amplifier having an output and an input coupled to said sense output of said corresponding switching circuit; and a comparator having a first input receiving said compensation signal, a second input coupled to said output of said sense amplifier, and an output that provides said reset signal.

8. The multiphase power converter of claim 6, wherein said PWM logic comprises gate control logic and at least one driver amplifier.

9. The multiphase power converter of claim 5, wherein each of said plurality of switching circuits comprises:
   first and second switches having current terminals coupled in series at a junction and having control inputs coupled to said at least one PWM output;
   an output inductor coupled between said junction and said DC output voltage; and
   a sense circuit that senses current of said output inductor and that provides said sense output.

10. The multiphase power converter of claim 9, wherein said first and second switches comprise first and second MOSFETs, respectively.

11. The multiphase power converter of claim 5, wherein said controller comprises an error amplifier.

12. The multiphase power converter of claim 5, wherein said controller comprises a sense amplifier having an input coupled to said common DC output voltage and an output that provides an output sense signal and an error amplifier that compares said output sense signal with a reference signal and that provides said compensation signal.

13. The multiphase power converter of claim 5, said plurality of regulators comprising N regulators coupled in a daisy-chain configuration, wherein a selected switching frequency FSW is achieved by programming said predetermined delay of each of said N regulators with a delay of 1/(N*FSW).

14. A method of controlling each of a plurality of cascadable regulators of a multiphase converter, comprising:
   coupling a digital output of each regulator to a digital input of another regulator;
   providing a digital output signal on the digital output after a predetermined delay in response to receiving a digital input signal at the digital input; and
   controlling a PWM cycle in response to receiving the digital input signal and in response to detecting an output condition.

15. The method of claim 14, further comprising programming a switching frequency FSW of the multiphase converter by programming the predetermined delay of each of N regulators coupled in cascade to 1/(N*FSW).

16. The method of claim 14, wherein said detecting an output condition comprises:
   detecting an output current condition and generating a sense signal; and
   comparing the sense signal with a compensation signal.

17. The method of claim 16, wherein said detecting an output current condition comprises detecting peak current.

18. The method of claim 17, wherein said detecting peak current comprises detecting peak current through an output inductor.

19. The method of claim 16, further comprising providing a central controller that senses an output voltage condition and that provides the compensation signal to each regulator.

20. The multiphase power converter of claim 6, wherein said PWN logic comprises:
   a latch that sets in response to said digital input signal and that resets in response to said reset signal;
   gate control logic, coupled to said latch, that provides at least one PWM control signals; and
   at least one driver amplifier, each responsive to said at least one PWM control signal.

21. The multiphase power converter of claim 20, wherein said gate control logic includes shoot-through protection.

* * * * *